US011574057B2

(12) United States Patent
Shrestha et al.

(10) Patent No.: US 11,574,057 B2
(45) Date of Patent: Feb. 7, 2023

(54) ENCRYPTION AS A SERVICE WITH REQUEST PATTERN ANOMALY DETECTION

(71) Applicant: Dell Products L.P., Round Rock, TX (US)

(72) Inventors: Rajan Shrestha, Georgetown, TX (US); Hung Dinh, Austin, TX (US); Bijan Mohanty, Austin, TX (US); Sabu K. Syed, Austin, TX (US); Greg Winslow, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 301 days.

(21) Appl. No.: 17/083,507

(22) Filed: Oct. 29, 2020

(65) Prior Publication Data

US 2022/0138321 A1      May 5, 2022

(51) Int. Cl.
*G06F 21/56* (2013.01)
*G06F 21/60* (2013.01)
*H04L 9/08* (2006.01)
*G06N 20/00* (2019.01)
*G06F 16/28* (2019.01)

(52) U.S. Cl.
CPC .......... *G06F 21/565* (2013.01); *G06F 16/285* (2019.01); *G06F 21/602* (2013.01); *G06N 20/00* (2019.01); *H04L 9/0891* (2013.01); *G06F 2221/034* (2013.01)

(58) Field of Classification Search
CPC .... G06F 21/565; G06F 21/602; G06F 16/285; G06F 2221/034; G06N 20/00; H04L 9/0891
See application file for complete search history.

(56) References Cited

U.S. PATENT DOCUMENTS

2019/0253476 A1\* 8/2019 Lee ..................... G06F 16/9017

FOREIGN PATENT DOCUMENTS

WO    WO-2012030296 A2 \*  3/2012   .......... G06F 21/602

\* cited by examiner

*Primary Examiner* — Hee K Song
(74) *Attorney, Agent, or Firm* — Daly, Crowley Mofford & Durkee, LLP

(57) ABSTRACT

A system and method mediate transfer of encrypted data files between local applications and external computer systems. Application containers perform cryptographic operations using stored credentials to decrypt data coming from these external systems and configurably forward them to the local applications, and to encrypt data sent from the local applications to the external systems. Access to this encryption-as-a-service (EaaS) functionality is gated by a fingerprint service that classifies requests by security level, and detects anomalous requests. Security classification is performed by a supervised machine learning algorithm, while anomalous request detection is performed by unsupervised machine learning algorithm. Stored keys are monitored, and when they near expiration or are damaged, embodiments proactively undertake key renewal and key exchange with the external computer systems. Containerization enables key storage in multiple vaults, thereby making such storage vendor-agnostic.

20 Claims, 9 Drawing Sheets

ENCRYPTION AS A SERVICE WITH REQUEST PATTERN ANOMALY DETECTION

FIELD

The disclosure pertains generally to transmission of digital information, and more particularly to architectures for providing a confidential data exchange among entities communicating through data packet networks wherein the data content is encrypted.

BACKGROUND

Computer systems often communicate over public data networks, such as the Internet, using cryptographic mechanisms to prevent third parties from accessing sensitive data. As the mathematical operations of encrypting and decrypting may be decoupled from the processes that generate the underlying data, cryptography may be provided in a cloud-based, service-oriented architecture ("SOA") as a service, commonly referred to as Encryption-as-a-Service ("EaaS"). Architectures that provide EaaS enable seamless encrypting of data before sending to an external system.

Despite their advantages, architectures that provide EaaS often suffer from various disadvantages. In the most common situation, each external computer system that communicates encrypted data uses its own cryptographic algorithm and/or cryptographic keys, so the architecture must provide several encryption services, each tightly coupled to a particular algorithm or key system that is itself determined by an external party. The complexity and cost of system maintenance increases as the number of external computer systems. Moreover, a cryptographic service often is presented as a standalone "solution" to the problem of data security, when in fact a consideration of broader architecture design principles such as service availability and restricting service use to only authorized users reveals that merely having EaaS does not provide optimal data security.

SUMMARY OF DISCLOSED EMBODIMENTS

Disclosed embodiments provide an enterprise framework to improve encryption as a service in several ways. First, artificial intelligence (AI) and machine learning (ML) techniques are leveraged to classify requests for cryptographic services, according to a "fingerprint" of request characteristics, into one of several security levels. Second, each request is analyzed against a pattern of historical requests to determine whether the given request is anomalous, and if so the architecture automatically intervenes by denying access to the cryptographic services or taking other remedial action. Third, embodiments provide intelligent key management that includes self-healing, such as automatically generating new keys as older keys approach expiration or are corrupted. Fourth, embodiments are agnostic with respect to the cryptographic algorithm, the data format, and other vendor-specific characteristics of secure data communication that might be imposed by external computer systems. And fifth, embodiments implement sensitive processes within data-isolated containers to avoid leakage of data between transaction instances.

Thus, a first embodiment is a system for mediating transfer of encrypted data files to and from a plurality of external computer systems. The system has a file store for storing the encrypted data files. The system also has a data store for storing cryptographic data (e.g. encryption and decryption keys) associated with each of the external computer systems. And the system has a container host system, communicatively coupled to the file store and the data store, for creating and hosting concurrent, data-isolated container processes for performing cryptographic operations. The container host system is configured to access a fingerprint service having (a) a content classification engine for classifying container processes into one of a plurality of security categories, and (b) an anomaly detection engine for detecting security anomalies on the basis of the classifying. And each container process is configured, when the fingerprint service does not detect it as having a security anomaly, to either (a) decrypt an encrypted data file in the file store received from an external computer system according to its associated stored cryptographic data, or (b) encrypt data, as an encrypted data file in the file store for subsequent transmission to an external computer system, according to its associated stored cryptographic data.

In some embodiments, the content classification engine is configured for classifying container processes using supervised machine learning.

In some embodiments, using the supervised machine learning comprises using a support vector machine trained on a corpus having data according to each of the plurality of security categories.

In some embodiments, the anomaly detection engine is configured for detecting security anomalies using unsupervised machine learning.

In some embodiments, using unsupervised machine learning comprises (a) creating a state space of historical container processes, and (b) detecting a security anomaly with respect to a given container process when the given container process has a path in an isolation tree that is shorter than a given threshold.

In some embodiments, the state space encodes one or more of: an identity of a data sender, an identity of a data receiver, a file type, a date, and a time of day.

In some embodiments, the anomaly detection engine further comprises a policy manager for, when a security anomaly is detected with respect to a given container process, taking a remedial action including one or more of: terminating or preventing execution of the given container process, alerting an individual about the security anomaly, and storing data associated with the security anomaly in a database for later visualization.

Some embodiments also include a key manager for ensuring that the cryptographic data stored in the data store are valid, wherein each container process hosted in the container host system is configured to access the key manager prior to using the cryptographic data.

In some embodiments, the key manager is configured for detecting that a cryptographic key, used to encrypt data files, has been corrupted or is nearing an expiration date, and for responsively generating a new cryptographic key and exchanging the new cryptographic key with the plurality of external computer systems.

In some embodiments, the data store comprises a plurality of vaults for storing cryptographic data, and wherein the container host system is configured for creating container processes according to data describing a target vault within the plurality of vaults.

Another embodiment is a method of mediating transfer of encrypted data files to and from a plurality of external computer systems. The method includes storing cryptographic data associated with each of the external computer systems in a data store. The method also includes creating and hosting concurrent, data-isolated container processes for performing cryptographic operations in a container host system. The method further includes accessing, by one of the hosted container processes, a fingerprint service for (a) classifying container processes into one of a plurality of security categories, and (b) detecting security anomalies on the basis of the classifying. And when the fingerprint service does not detect that the one of the hosted container processes has a security anomaly, the method includes either (a) decrypting an encrypted data file received from an external computer system according to its associated stored cryptographic data, or (b) encrypting data, as an encrypted data file for subsequent transmission to an external computer system, according to its associated stored cryptographic data.

In some embodiments, classifying container processes comprises using supervised machine learning.

In some embodiments, using the supervised machine learning comprises using a support vector machine trained on a corpus having data according to each of the plurality of security categories.

In some embodiments, detecting security anomalies comprises using unsupervised machine learning.

In some embodiments, using unsupervised machine learning comprises (a) creating a state space of historical container processes, and (b) detecting a security anomaly with respect to a given container process when the given container process has a path in an isolation tree that is shorter than a given threshold.

In some embodiments, the state space encodes one or more of: an identity of a data sender, an identity of a data receiver, a file type, a date, and a time of day.

Some embodiments further include, when a security anomaly is detected with respect to a given container process, taking a remedial action including one or more of: terminating or preventing execution of the given container process, alerting an individual about the security anomaly, and storing data associated with the security anomaly in a database for later visualization.

In some embodiments, each container process hosted in the container host system is configured to access a key manager prior to using the cryptographic data.

In some embodiments, the key manager is configured for detecting that a cryptographic key, used to encrypt data files, has been corrupted or is nearing an expiration date, and for responsively generating a new cryptographic key and exchanging the new cryptographic key with the plurality of external computer systems.

In some embodiments, the data store comprises a plurality of vaults for storing cryptographic data, and wherein the container host system is configured for creating container processes according to data describing a target vault within the plurality of vaults.

Another embodiment is a tangible, computer-readable storage medium that non-transitorily stores program code for performing the above method, or any of its variants.

It is appreciated that the concepts, techniques, and structures described herein may be embodied in other ways without deviating from their teachings, and thus that the embodiments described above are only illustrative, not limiting.

DESCRIPTION OF THE SEVERAL VIEWS OF THE DRAWINGS

The manner and process of making and using the disclosed embodiments may be appreciated by reference to the drawings, in which.

DETAILED DESCRIPTION OF EMBODIMENTS

Figure 1:
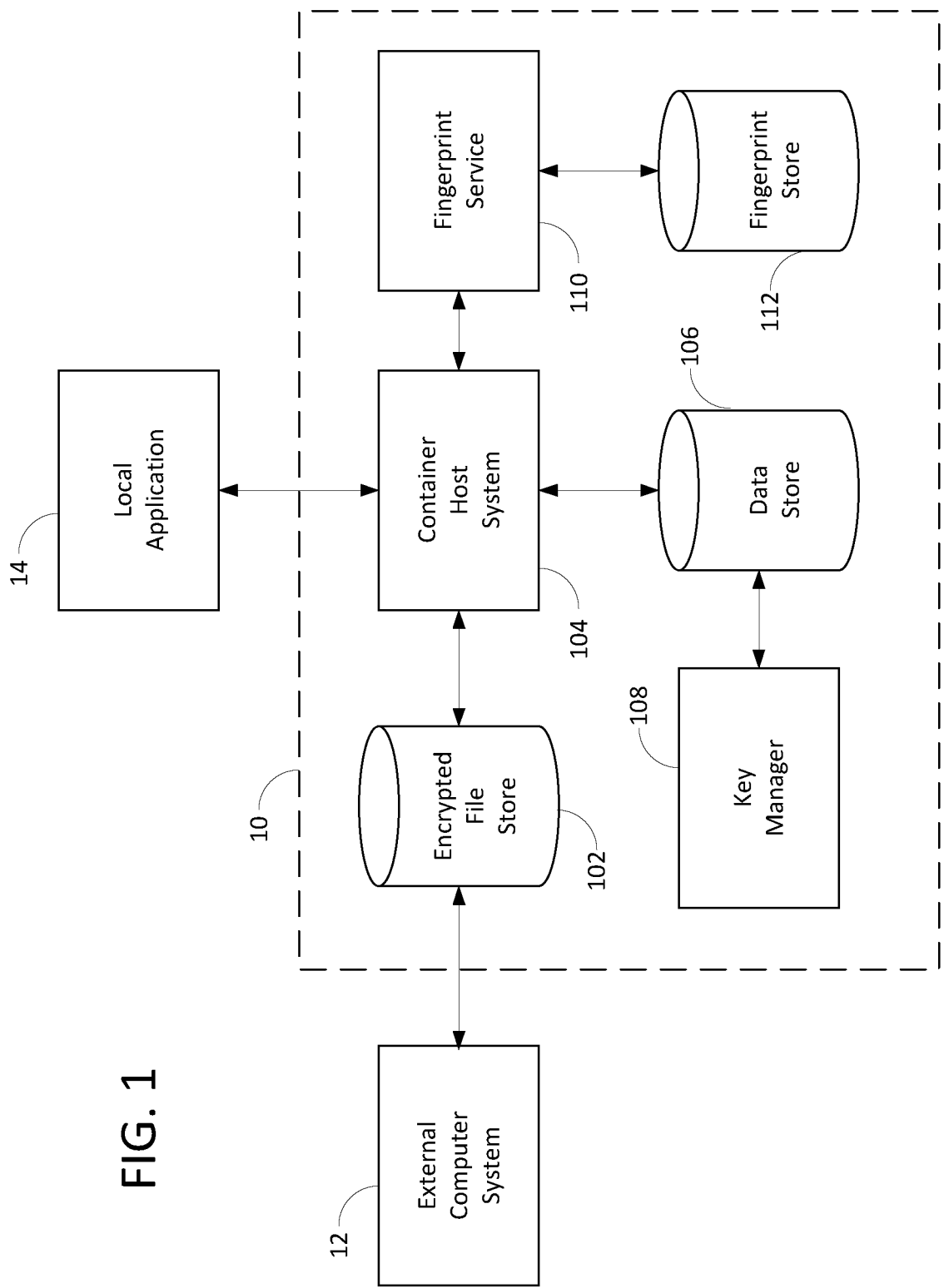
FIG. 1 schematically shows a system for mediating transfer of encrypted data files to and from a plurality of external computer systems according to an embodiment.

In FIG. 1 is schematically shown a system 10 for mediating transfer of data files. In accordance with the embodiment of FIG. 1, the system 10 facilitates communication of encrypted data between one or more "external" computer systems (of which external computer system 12 is illustrative) and one or more "local" applications (of which local application 14 is illustrative). The external computer system 12 may be any computer system known in the art that is capable of communicating encrypted data. The local application 14 may be any application known in the art for providing a function to an end user, including without limitation an application executing in a cloud-based, service-oriented architecture (SOA).

The local application 14 may comprise a file sharing service (e.g. one that communicates using a file sharing protocol such as Server Message Block (SMB)), or a message broker (e.g. the Kafka platform from Apache Software Foundation of Forest Hill, Md. or the RabbitMQ platform from Pivotal Software of San Francisco, Calif.), or a file storage service (e.g. one that stores files to a network-attached storage (NAS) system or a storage area network (SAN)), or any other application the provides an application programming interface (API) for producing or consuming data. In this connection, the system 10 provides encryption functionality as a modular service to applications (and more particularly, to their implementing services) within an SOA.

It is appreciated that the system 10 may communicate with the external computer system 12 according to any mutually-agreed data exchange protocol, which may be publicly known. The system 10 thus advantageously does not require the owner of the external computer system 12 to perform any proprietary software development. Likewise, the system 10 may communicate with any local application 14 according to the design of the latter by appropriately configuring a container process, as described below, for such communication. In this way, the system 10 advantageously provides encryption services to the local application 14 without needing to reconfigure the local application 14. Thus, the system 10 may be viewed by both the external computer system 12 and the local application 14 as a "black box" cryptographic service. It is further appreciated that any number of external computer systems may communicate with any number of local applications (e.g. in a local SOA) using the system 10 as intermediary, and thus that the depiction of a single external computer system 12 and a single local application 14 in FIG. 1 is merely illustrative, not limiting.

In accordance with embodiments disclosed herein, the system 10 includes a file store 102 for storing the encrypted data files. The file store 102 may be implemented using any technology known in the art, such as a file server coupled to a public data network (e.g. the Internet) via a data exchange protocol (e.g. the secure file transfer protocol (SFTP) or secure hypertext transfer protocol (HTTPS), or similar protocol). Access to the file store 102 may be suitably restricted, using known techniques, so that external computer systems (such as external computer system 12) may deposit or retrieve files therein only when authorized by the system 10. Because the file store 102 sends and receives data through a public data network, in various embodiments the files stored therein are encrypted, and the file store 102 may be referred to herein as an encrypted file store.

The system 10 also includes a data store 106 for storing cryptographic data (e.g. keys, passwords, certificates, and other secret data) associated with each of the external computer systems. As just noted, the files stored in the file store 102 may be encrypted. As is known in the art, each external computer system 12 may encrypt data according to a different cryptographic algorithm. Thus, the data store 106 is provided to locally store cryptographic information (e.g. public keys) necessary to encrypt data files before sending to each respective external computer system 12, and other cryptographic information (e.g. local private keys) for decrypting data files sent to the system 10.

The system 10 also includes a container host system 104, communicatively coupled to the file store 102 and the data store 106, for creating and hosting concurrent, data-isolated container processes for performing cryptographic operations as known in the art. As known in the art, a "container" is a runtime environment executing a software process or application in a manner that is portable between underlying computer systems. That is, a container includes an application of interest, together with all of the other software on which it depends to execute, including libraries, other executable files, configuration files, an operating system (which may or may not be virtualized), and so on. The container host system 104 thus may be any computer system known in the art that executes a container platform, including without limitation the single-host container platform from Docker, Inc. of Palo Alto, Calif., or the cluster-based container platform Kubernetes from the Cloud Native Computing Foundation, or a combination of Docker and Kubernetes.

Figure 2:
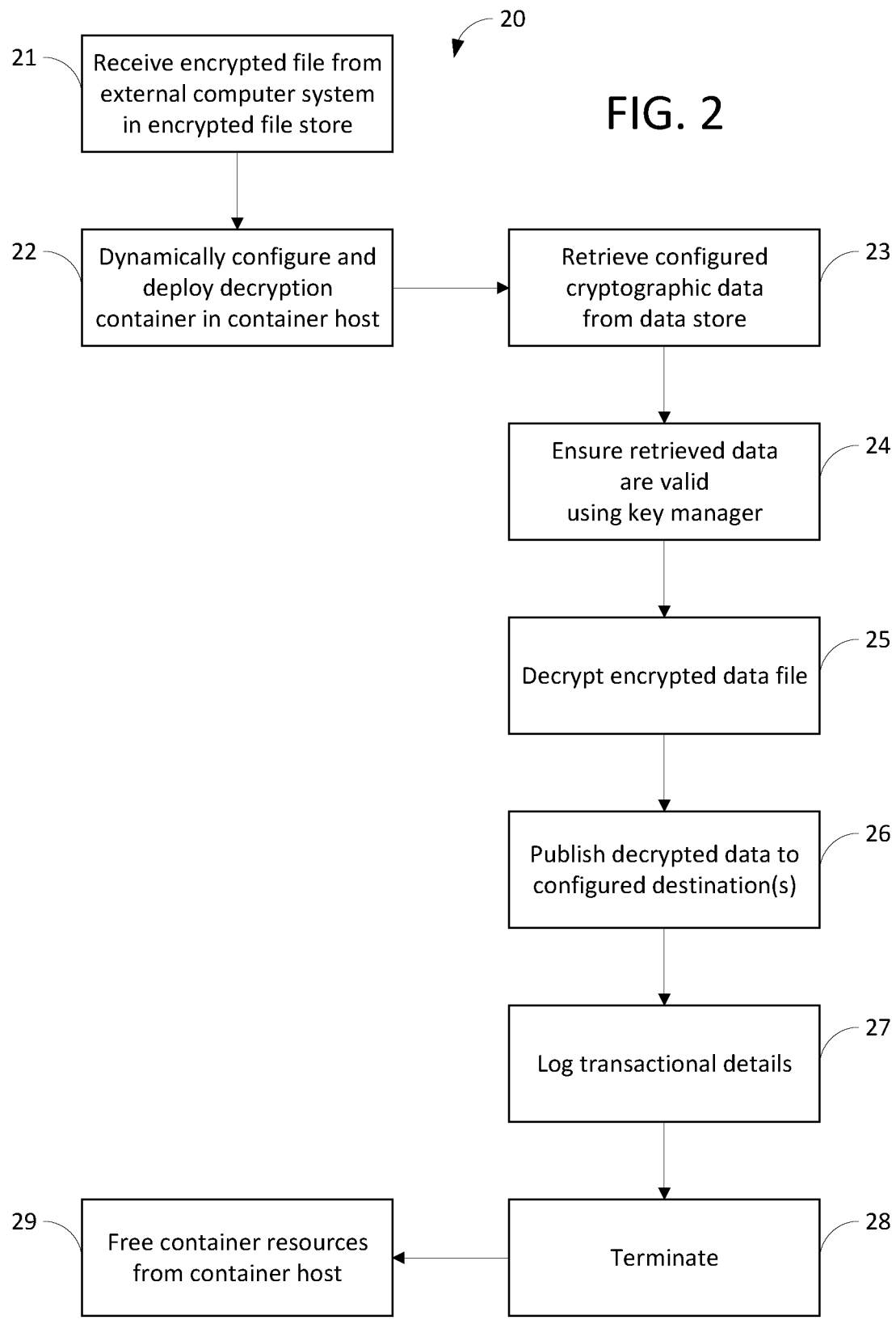
FIG. 2 shows a flowchart of a method of decrypting an encrypted file received from an external computer system for consumption by one or more local applications according to an embodiment.
Figure 3:
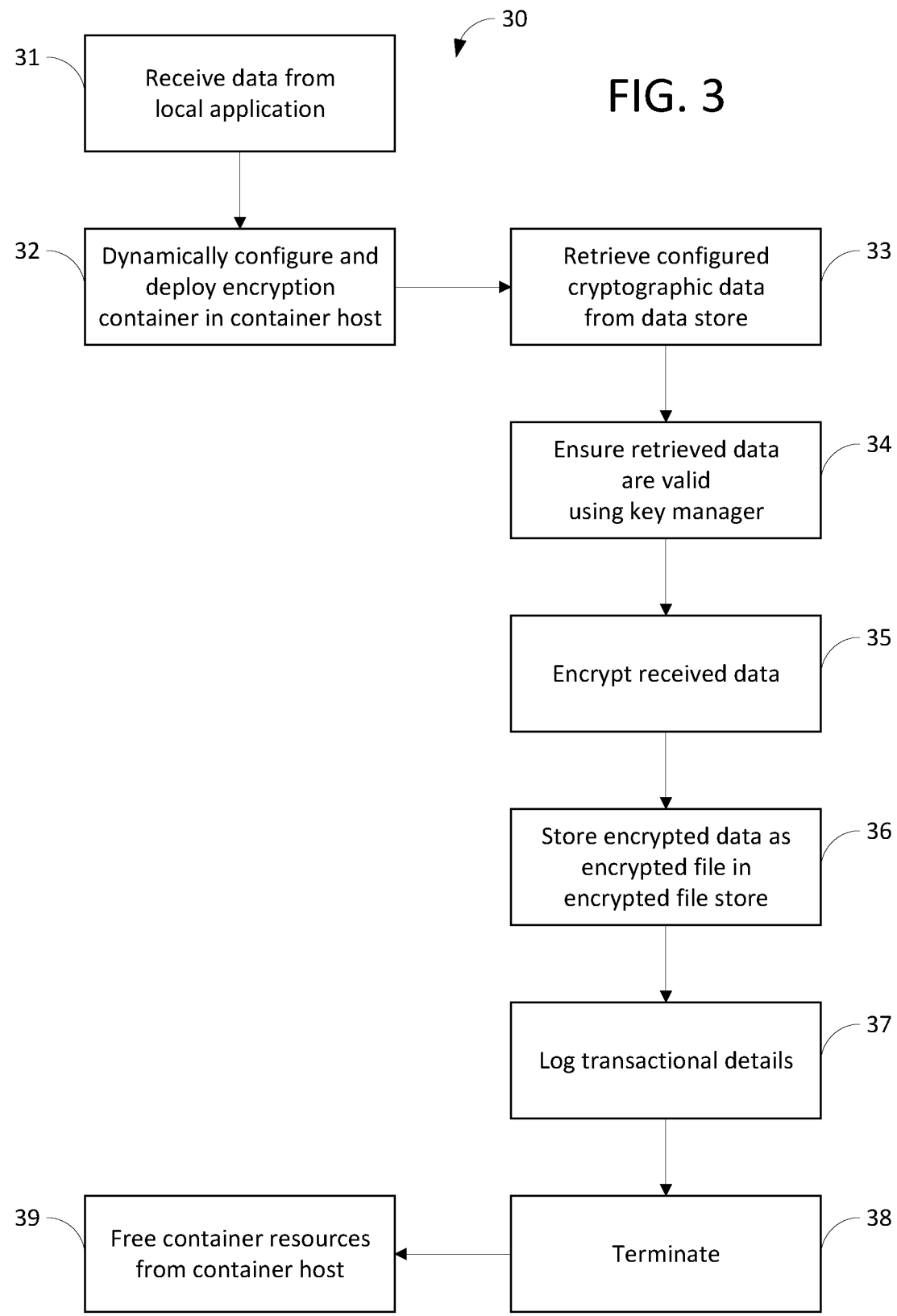
FIG. 3 shows a flowchart of a method of encrypting data as an encrypted file for transmission to an external computer system on behalf of a local application according to an embodiment.

In accordance with embodiments, the container host system 104 physically executes one or more containers, and the containerized application is either an encryption or decryption application, depending on whether data are to be transmitted from the local application 14 to the external computer system 12 or vice versa. The operation of a typical containerized decryption is shown in FIG. 2, while the operation of a typical containerized encryption is shown in FIG. 3.

Advantageously, the containerized applications may be dynamically configured in real time according to the external computer system 12, the local application 14 (or multiple such applications, if several need to consume a received encrypted file), and other metadata described below. Also advantageously, cryptographic operations on decrypted data are performed only in volatile memory, and these data are not accessible by any processes outside their respective containers, including by other processes executing concurrently on the container host machine. Thus, the processes described herein have a very high level of data security.

Figure 4:
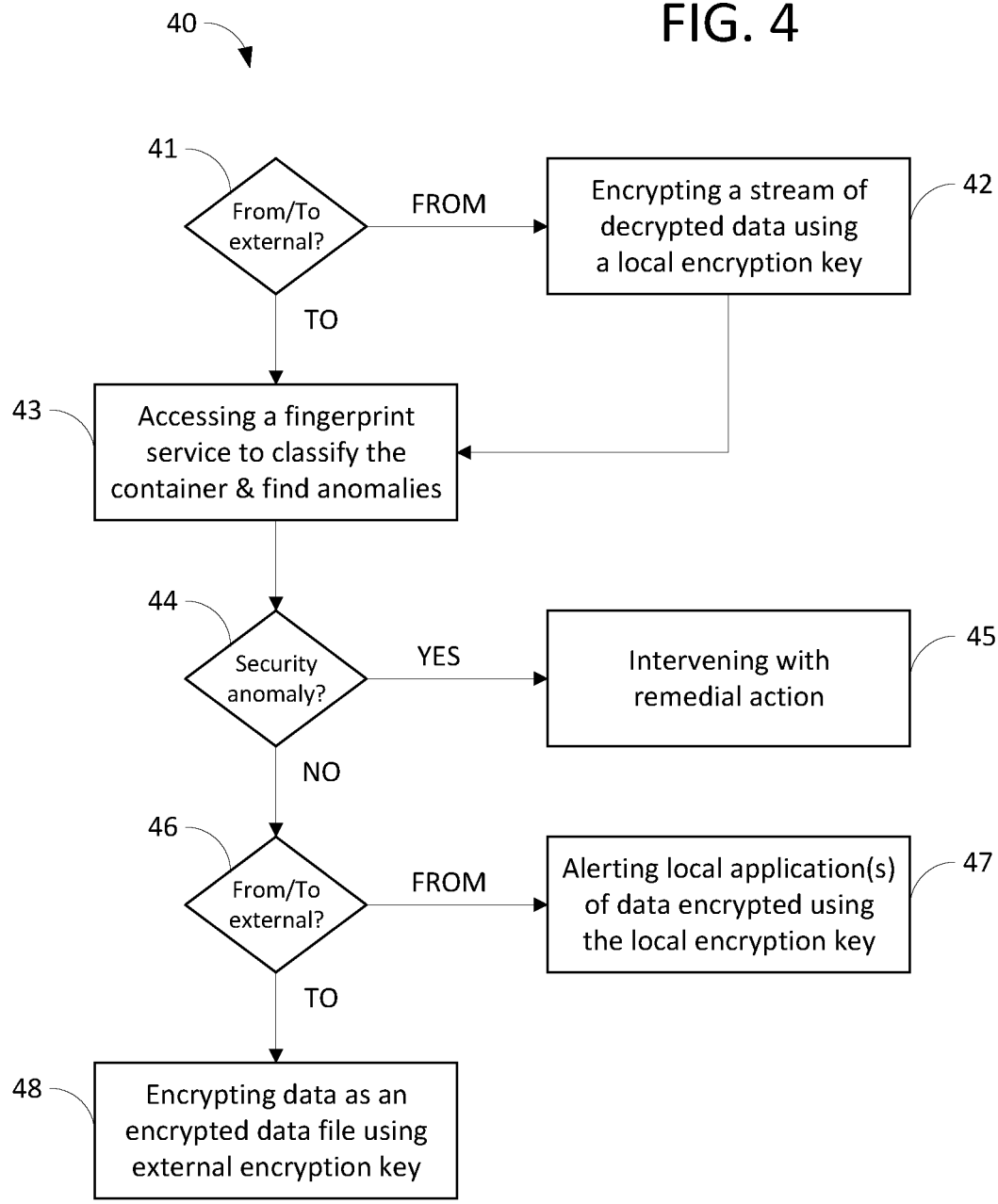
FIG. 4 shows a flowchart of a method of mediating transfer of encrypted data files to and from a plurality of external computer systems according to an embodiment.

It is appreciated that the container host system 104 may execute other containerized applications in various embodiments, and in particular the container host system 104 may execute a containerized fingerprint service 110 that stores certain data in a fingerprint store 112. The overall operation of the system 10 is shown in FIG. 4, and the function and operation of the fingerprint service 110 are shown in FIGS. 5 through 8. Although depicted as separate elements in FIG. 1, the fingerprint service 110 may be containerized and executed by the container host system 104. In alternate embodiments, it may be executed on a different container host (not shown), or provided as a non-containerized service or micro-service within a service-oriented architecture (SOA), or as a standalone application. Thus, the container host system 104 is described in what follows as "accessing" the fingerprint service 110, but the depiction of the container host system 104 and the fingerprint service 110 as separate elements should not be viewed as limiting. The fingerprint store 112 provides all data storage requirements for the functions of the fingerprint service 110, and may be implemented using a database or other non-volatile memory known in the art.

In embodiments, the fingerprint service 110 classifies container processes into one of a plurality of security categories. These categories may be, for example, "Highly Restricted", or "Restricted", or "Private", or "Public", or categories having any other, similar designations. Moreover, the fingerprint service 110 detects when a requested container process would have a classification that is a historical outlier, and in such cases takes remedial action, which may include preventing the container host system 104 from executing the container process at all. However, when the fingerprint service does not detect it as having a security anomaly, each container process is configured to provide an appropriate encryption-as-a-service (EaaS) function; that is, to either (a) decrypt an encrypted data file in the file store received from an external computer system according to its associated stored cryptographic data, or (b) encrypt data, as an encrypted data file in the file store for subsequent transmission to an external computer system, according to its associated stored cryptographic data.

In some embodiments, the data store 106 comprises a plurality of vaults for storing cryptographic data. In this connection, a "vault" is a self-contained system or function for storing and accessing cryptographic secrets, such as the Azure Key Vault from Microsoft Corporation of Redmond, Wash., or the HashiCorp Vault from HashiCorp of San Francisco, Calif., or the Conjur system from CyberArk Software, Inc. of Newton, Mass. In such embodiments, the container host system is configured for creating container processes according to data describing a target vault within the plurality of vaults. In this way, the system 10 is vault-agnostic, and thus configurable to accommodate data security requirements placed on the system 10 by the external computer system 12. Advantageously, this permits the system 10 to operate with a wide variety of external computer systems without placing reciprocal data security requirements on those systems.

Some embodiments of the system 10 include a key manager 108 for ensuring validity of the cryptographic data that are stored in the data store 106. In particular, the key manager 108 may be used to generate new keys, and thus perform "self-healing" of the encryption process, in various scenarios. Each container process hosted in the container host system 104 may access the key manager 108 to validate the relevant cryptographic data in the data store 106 prior to its use.

Illustratively, the key manager 108 may read the expiration date periodically for each key stored in the data store 106. When the key expiration date approaches (e.g. is within a set period such as a month or several weeks), the key manager 108 will automatically invoke a key generation utility known in the art for creating encryption keys. The key manager 108 will then initiate an appropriate key exchange process with each of the external computer systems 12, thus ensuring that the latter systems always possess valid encryption keys for the local SOA. This function proactively eliminates key expiration issues and prevents business outages. Separately, the key manager 108 may detect key corruption issues, for example if the data store 106 suffers data loss. In this situation, the key manager 108 also triggers the key generation utility to correct the issue, or create new keys as needed, and exchange the new keys with the external computer systems 12. It is appreciated that other key management functions may be performed by the key manager 108 in accordance with embodiments, and thus that the two scenarios just described are illustrative and not limiting.

In FIG. 2 is shown a flowchart of a method 20 of decrypting an encrypted file received from an external computer system for consumption by one or more local applications according to an embodiment. The external computer system may be system 12, and the one or more local applications may include local application 14. The method 20 may be performed by a container host system, such as system 104, executing a containerized application.

The method 20 begins with a process 21 in which the container host system receives an encrypted file from the external computer system in an encrypted file store. The encrypted file store may be the file store 102. Receipt of the encrypted file may be monitored by the system 10 and the monitoring function may trigger execution of the remainder of the method 20.

The method 20 continues with a process 22 in which the container host system dynamically configures and deploys a decryption container. Dynamic configuration may include, among other things, obtaining a container image file from a code repository, and configuring the container to operate with respect to a particular source (i.e. the identity of the external computer system), the one or more local applications, and a target secure vault in which the relevant cryptographic data are stored. It is appreciated that various embodiments may also permit dynamic configuration of other pertinent features of the container, such as logging targets, that would be easily identified by a person having ordinary skill in the art.

The method 20 continues with a process 23 in which the container itself retrieves necessary cryptographic data from a data store according to the dynamic configuration. The necessary data illustratively includes a decryption key, but may include other useful data such as a public key certificate to permit validation of a digital signature or to authenticate the contents of the encrypted data file. The data store may be the data store 106.

The method 20 then moves to a process 24 that ensures the retrieved cryptographic data are valid using a key manager. The key manager may be the key manager 108, and may validate the cryptographic data using the processes described above in connection with FIG. 1. In particular, if the stored cryptographic data are not valid, or are at risk of becoming invalid, then the key manager may undertake such self-healing measures as necessary to ensure that these data become valid before proceeding with the remaining processes in the method 20.

The method 20 then advances to a process 25 which decrypts the encrypted data file according to the validated cryptographic information (i.e., the decryption key). The process 25 may be performed using any data decryption technique known in the art.

The method 20 then continues with a process 26 that publishes the decrypted data to the one or more local applications according to the dynamic configuration. Publication of this data may proceed according to the specific interface between the container host system and each application. Illustratively, if a local application requires a file, the decrypted data may be provided as such, while if the local application requires a stream of data, the decrypted data may be provided using a streaming protocol. And if the local application provides an API, the decrypted data may be submitted using the API. Data indicating how the decrypted data should be provided to each type of local application advantageously may be provided in configuration files, so that no software must be rewritten when local applications change their data interfaces or new applications are connected to the system 10, in accordance with principles of software design and abstraction.

The method 20 may move to an optional process 27 in which transactional details are logged. Logging is a well-known function in the art of computer software design and implementation, and a person having ordinary skill in the art will appreciate whether and how to implement the process 27 in accordance with various embodiments.

The method 20 then moves to a process 28 in which the container terminates. This process 28 is relevant only to the extent that its occurrence triggers the process 29 in the container host system itself, namely the automatic freeing of the container resources used by the container so that other containers may be executed.

In FIG. 3 is shown a flowchart of a method 30 of encrypting data as an encrypted file for transmission to an external computer system on behalf of a local application according to an embodiment. The external computer system may be system 12, and the one or more local applications may include local application 14. The method 30 may be performed by a container host system, such as system 104, executing a containerized application. The method 30 is similar to the method 20, but is performed in the reverse direction.

The method 30 begins with a process 31 in which the container host system receives data from the local application. Receipt of this data may proceed according to the specific interface between the container host system and the application. Illustratively, if a local application produces a file, the data may be provided as such to the container host system, while if the local application produces a stream of data, the data may be provided using a streaming protocol. The local application may invoke an API of the container host system for this purpose. Data indicating how the data should be provided from each type of local application advantageously may be provided in configuration files, so that no software must be rewritten when local applications change their data interfaces or new applications are connected to the system 10, in accordance with principles of software design and abstraction.

The method 30 continues with a process 32 in which the container host system dynamically configures and deploys an encryption container. Dynamic configuration may include, among other things, obtaining a container image file from a code repository, and configuring the container to operate with respect to a particular source (i.e. the identity of the local application), the destination (i.e. the identity of the external computer system), and a target vault in which the relevant cryptographic data are stored. It is appreciated that various embodiments may also permit dynamic configuration of other pertinent features of the container, such as logging targets, that would be easily identified by a person having ordinary skill in the art.

The method 30 continues with a process 33 in which the container retrieves necessary cryptographic data from a data store according to the dynamic configuration. The necessary data illustratively includes a decryption key, but may include other useful data such as a public key certificate. The data store may be the data store 106.

The method 30 then moves to a process 34 that ensures the retrieved cryptographic data are valid using a key manager. The key manager may be the key manager 108, and may validate the cryptographic data using the processes described above in connection with FIG. 1. In particular, if the stored cryptographic data are not valid, or are at risk of becoming invalid, then the key manager may undertake such self-healing measures as necessary to ensure that these data become valid before proceeding with the remaining processes in the method 30.

The method 30 then advances to a process 35 which encrypts the received data according to the validated cryptographic information (i.e., the encryption key). The process 35 may be performed using any data encryption technique known in the art.

The method 30 then continues with a process 36 that stores the encrypted data to the encrypted file store. The encrypted file store may be the file store 102. Storage of the encrypted file may be monitored by the system 10 and the monitoring function may trigger an event that causes transmission of the encrypted file to the external computer system. Alternately, the external computer system may poll the encrypted file store and download the file at a later time.

The method 30 may move to an optional process 37 in which transactional details are logged. Logging is a well-known function in the art of computer software design and implementation, and a person having ordinary skill in the art will appreciate whether and how to implement the process 37 in accordance with various embodiments.

The method 30 then moves to a process 38 in which the container terminates. This process 38 is relevant only to the extent that its occurrence triggers the process 39 in the container host system itself, namely the automatic freeing of the container resources used by the container so that other containers may be executed.

In FIG. 4 is shown a flowchart of a method 40 of mediating transfer of encrypted data files to and from a plurality of external computer systems according to an embodiment. In accordance with the embodiment of FIG. 4, the method 40 facilitates communication of encrypted data between one or more external computer systems (of which external computer system 12 is illustrative) and one or more local applications (of which local application 14 is illustrative). In particular, the method 40 may be viewed as an implementation of the process 26 that receives decrypted data and publishes it to a local application. The method 40 also may be viewed as an implementation of the process 35 that encrypts received data from a local application before transmitting it to the one or more external computer systems.

The method 40 begins with determining 41 whether it is mediating a transfer of data from an external computer system, or to an external computer system. If the data are being transferred from the external computer system, the method 40 moves to encrypting 41 a stream of decrypted data using a local encryption key (i.e. an encryption key that permits local applications to decrypt the data). The stream of decrypted data is obtained as a result of process 25 that decrypted the data using a decryption key for the external computer system. Thus, except for data that are just received from an external computer system, sensitive data are always either stored transiently in memory or stored non-transiently using a local encryption key. This design feature may apply to data travelling in both directions, while advantageously isolating encryption data pertaining to the external computer systems (e.g. their keys) from local applications, for added data security.

The method 40 next includes accessing 43, by the hosted container process, a fingerprint service for two purposes. The first purpose is classifying container processes into one of a plurality of security categories, as described below in more detail in connection with FIGS. 5 and 6. The second purpose is detecting and acting on security anomalies on the basis of the classifying, as described below in more detail in connection with FIGS. 7 and 8. The fingerprint service may be illustratively provided by the fingerprint service 110.

When the fingerprint service detects 44 a security anomaly, the method 40 moves to intervening 45 with remedial action. The different types of remedial action are described below in more detail, but severe anomalies require termination of the container executing the process mediating the data transfer.

When the fingerprint service does not detect 44 that the one of the hosted container processes has a security anomaly, the method 40 again determines 46 the direction of the data transfer. If the data transfer is from an external computer system to the local applications, the method 40 advances to a process 47 for alerting the one or more local applications to the data that were encrypted in the process 41. As mentioned above, these data are decryptable using a key that is available to the local application. By contrast, if the data transfer is to an external computer system from a local application, the method 40 continues to a process 48 for encrypting data, as an encrypted data file for subsequent transmission to the external computer system, according to its associated stored cryptographic data (i.e. using an external encryption key, such as a public key).

If the method 40 is mediating data transfer to an external computer system, embodiments proceed to the process 36 and stores the data in an encrypted file store. Either way, embodiments then log transactional details and terminate, as in FIGS. 2 and 3.

Having described the composition and operation of a system and method mediating the transfer of encrypted data, the composition and operation of a fingerprint service (such as service 110) are now described. The fingerprint service provides two critical capabilities. First, it provides request content classification: the service analyzes the content of each file sent for encryption and classifies the file using machine learning and NLP. Second, it provides encryption request anomaly detection: the service monitors the encryption request metadata in a historical context and detects anomalies based on any deviations from the normal patterns.

Figure 5:
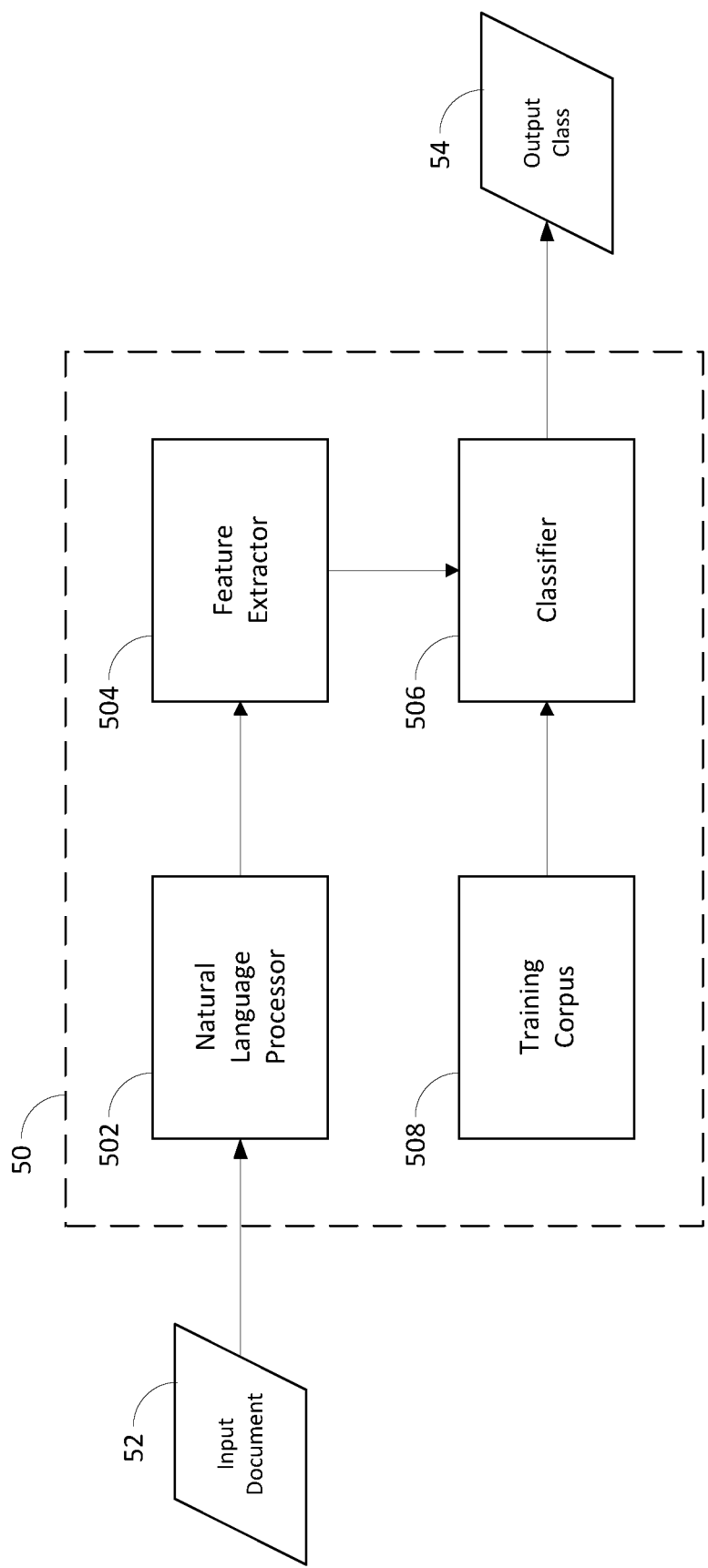
FIG. 5 schematically shows a content classification engine for classifying container processes into one of a plurality of security categories according to an embodiment.

In the first connection, FIG. 5 schematically shows the components of a content classification engine 50 for classifying container processes (or more particularly, documents for encryption by those container processes) into one of a plurality of security categories according to an embodiment. That is, the content classification engine 50 converts an input document 52 into an output security class 54. The content classification engine 50 may be used with container processes built and deployed on the container host system 104, or on another container host system (not shown). Thus, is it appreciated that the structures shown in FIG. 5 may be used with structures other than those shown in FIG. 1.

The content classification engine 50 includes a natural language processor 502, a feature extractor 504, a classifier 506, and a training corpus 508. Each of these components is well known in the art, and an embodiment of the concepts, techniques, and structures disclosed herein was implemented in the Python programming language using the Natural Language Toolkit (NLTK) software platform and text corpus, along with the SciKit-Learn machine learning libraries, the NumPy libraries for multi-dimensional arrays, and the pandas libraries for data analysis. It is appreciated that a person having ordinary skill in the art may desire to embody the concepts, techniques, and structures disclosed herein using other programming languages, and would understand how to do this without undue experimentation.

While the types of components used in the content classification engine 50 are generally known, it is also well known that different artificial intelligence and machine learning techniques perform better in different problem spaces, and thus that the choice of algorithms and method of implementation are both essential to providing a useful AI/ML system. Classification of documents into different classes or levels of security for encryption purposes is a problem whose solution through AI/ML techniques requires particular care. It was determined that the best model for this classification uses supervised (as opposed to unsupervised) machine learning, and in particular a support vector machine trained on a corpus having data according to each of the plurality of security categories.

Figure 6:
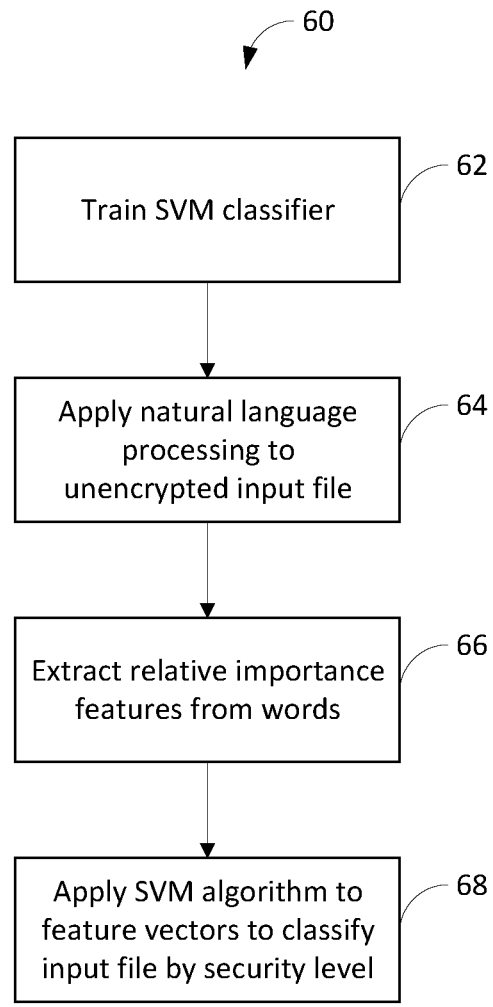
FIG. 6 shows a flowchart of a method of classifying container processes into one of a plurality of security categories according to an embodiment.

Thus, in FIG. 6 is shown a flowchart of a method 60 of classifying container processes into one of a plurality of security categories according to an embodiment. The method 60 may be performed by the content classification engine 50 shown in FIG. 5. However, this is not strictly necessary, and the method 60 may be performed by other structures.

The data classification metadata needs to be derived based on the content of the input file. The method 60, also called Intelligent Finger Printing (IFP), uses supervised learning to classify the input file into various security categories like Highly Secure, Secure, Public, Private, and so on. This is done with the help of Natural Language Processing (NLP) and a classification algorithm called Support Vector Machine (SVM). IFP uses various corpus to train the SVM model on what word or phrase will classify under what category. The SVM algorithm was selected in particular to classify the file content based on the very high degree of accuracy it provides, as compared to other supervised learning algorithms.

In this situation, the decrypted contents of a file sent for encryption are passed to the SVM model for classification. SVM performs multi-class classification of the content by finding the hyperplane that separates the classes in n-dimensional space. The SVM algorithm draws that hyperplane by transforming the data with the help of mathematical functions known in the art called "kernels". There are many different types of kernels, but in this case, the method 60 uses a general-purpose Radial Basis Function (RBF) kernel which supports non-linearity.

The model is trained using a corpus of data that contains words and phrases of each class or level of security restriction. For example, the presence of a social security number (SSN) or credit card information can make the classification of the content highly restricted. Similarly, the corpus contains words and phrases that can make the classification normally restricted, private, public, or any other categories.

Thus, the method 60 begins with a process 62 to train an SVM classifier. Training is accomplished by providing the classifier with a corpus of input documents and indicating which of these documents belongs to which security class. That is, the training is supervised. During this process 62, hyperparameters are tuned to improve performance and accuracy of the model. The process 62 must be performed before live data are submitted for classification, so this process may be viewed as an initialization step.

Next, the method 60 continues with a process 64 to apply natural language processing (NLP) to an unencrypted input file. The text data from the file content are pre-processed to remove any unwanted characters and stop words. The process 64 also involves stemming and lemmatization, as well as changing text to lower case, removing punctuation, and removing bad characters. A person having ordinary skill in the art may appreciate that other NLP techniques (e.g. named entity recognition) may be used to normalize the input words and phrases.

The method 60 advances to a process 66 to extract relative importance features from the words and phrases resulting from the NLP pre-processing. In this process 66, the text document is converted to a matrix of token counts and then transformed to a vectorized, Term Frequency-Inverse Document Frequency (TFIDF) representation. According to TFIDF, the importance of a word or phrase increases proportionally with the number of times it appears in a document, but this score is offset by the frequency of the word in the corpus. Thus, the training corpus should be representative of documents specifically meant to be encrypted using the concepts, techniques, and structures described herein, rather than documents of a more general nature. A corpus of such training documents might be obtained from the historical archives of a mature SOA, if one is available.

The method 60 concludes with a process 68 that applies the SVM classifier algorithm to the feature vector extracted from the input document to classify the input file by security level. In some implementations, the feature vector defines a point in a multi-dimensional state space, and the security level is computed as a function of which side of a number of classifying hyperplanes that point lands on (when adjusted by an appropriate kernel, in this case an RBF kernel).

While an SVM classifier was found to be best for this particular task, other AI/ML classifiers could be used in various embodiments. Illustratively, the SVM classifier could be replaced with a random forest classifier, or a neural network classifier, as those classifiers are known in the art. It is appreciated that, should such a replacement be made, a person having ordinary skill in the art would understand how to modify FIGS. 5 and 6 and their above descriptions to perform content classification into one of a plurality of security categories without undue experimentation.

Figure 7:
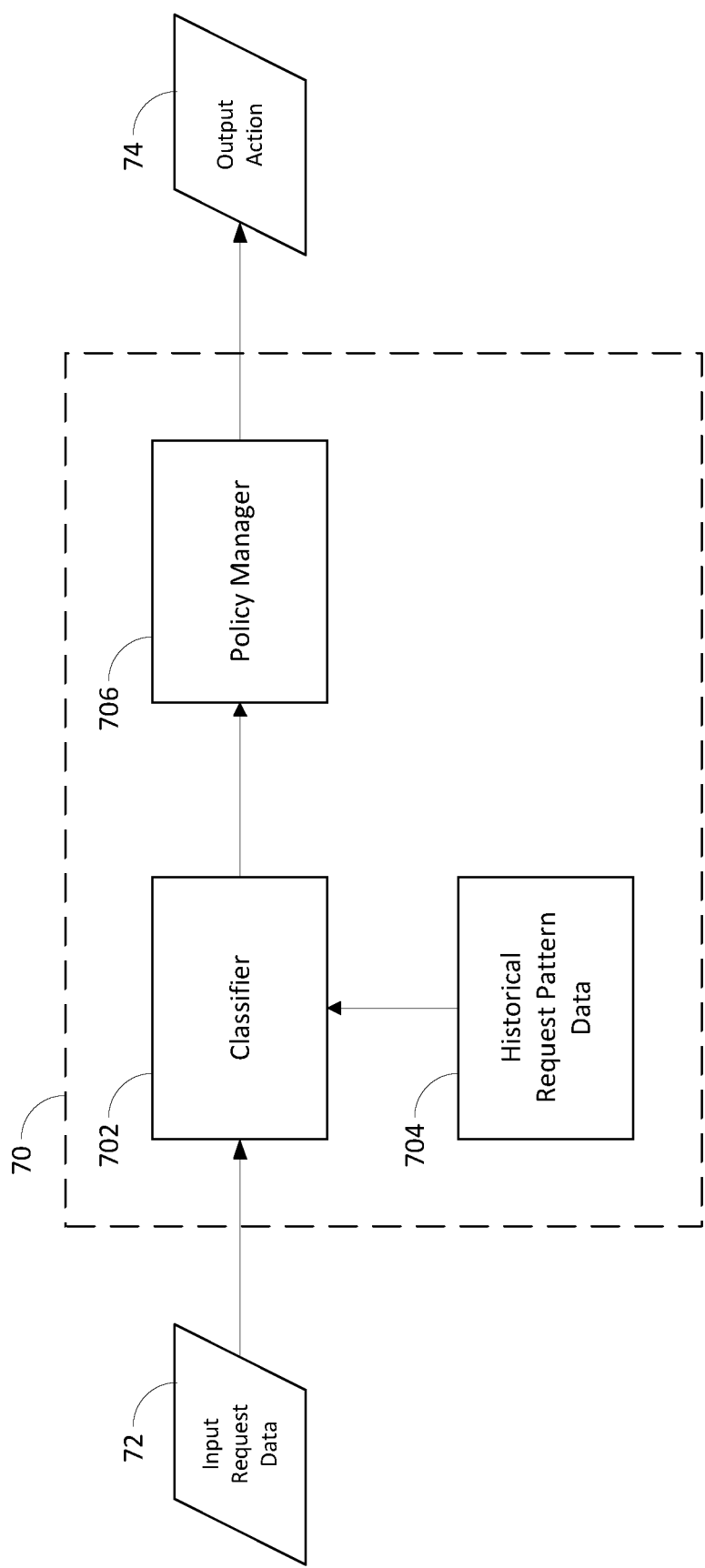
FIG. 7 schematically shows an anomaly detection engine for detecting and acting on security anomalies according to an embodiment.

As noted, a fingerprint service according to an embodiment provides two capabilities: content classification and request anomaly detection. FIGS. 5 and 6 illustrate content classification, discussed above. In the second connection, FIG. 7 schematically shows an anomaly detection engine 70 for detecting and acting on security anomalies according to an embodiment. Anomaly (or outlier) detection in this context means identifying an abnormal situation based on the analysis of certain properties being considered.

Encryption as a service (EaaS) is typically used by various services (e.g. local applications) to encrypt files whose contents always, or nearly always, follow a specific pattern. Some services transmit files that include highly restricted contents such as social security numbers, bank account or credit card numbers, and the like. Others use merely private content for encryption, such as street addresses and telephone numbers. Any deviations from their normal behavior is considered an outlier or anomaly, and must be either rejected or alerted for further investigations. This is a primary function of the fingerprint service, and of the anomaly detection engine 70 specifically.

The anomaly detection engine 70 converts input request data 72 for an encryption request, into an output action 74 taken by the fingerprint service. The input request data 72 include, in accordance with embodiments, the security class or level determined by the content classification engine 50. The input request data 72 may further include, illustratively and for purposes of analyzing the request: an identity of the data sender (e.g. the local application requesting encryption); an identity of the data receiver (e.g. an external computer system); a file type; a date; and a time of day. The output action 74 may include, when appropriate, alerting an individual of anomalous activity, or logging the activity to a database for later visualization, or rejecting execution of the requested encryption (i.e. by preventing the container host system from instantiating a container process), any combination of these, or any similar remedial action.

By contrast to the supervised AI/ML techniques determined best for use classifying content into different security classes or levels, it was determined that the best model for detecting security anomalies uses unsupervised machine learning, and in particular the isolation forest method. This multivariate algorithm is highly optimized for accurate anomaly detection, and does not require labeled training data. Isolation forest has the capacity to scale up to handle extremely large data sets and high-dimensional problems with a large number of irrelevant attributes.

As is known in the art, the core of the isolation forest algorithm lies in "isolating" an anomaly by creating decision trees over random attributes. That is, a random attribute (i.e. axis in the multidimensional state space) is selected, then values the points might take are partitioned randomly into ranges; each point in the state space falls into one of these partitions, and typically several points will. This process is continued recursively with another random attribute until single points are isolated in an "isolation tree".

This random partitioning produces significantly shorter paths to reach isolated points, since anomalies are few and result in smaller partitions, and distinguishable attribute values are more likely to be separated in early partitioning. Hence, when a forest (group) of random isolation trees collectively produces shorter path lengths for some particular points, then those points are highly likely to be anomalies. In other words, larger number of partitions are required to isolate a normal point while an anomaly can be isolated by a shorter number of partitions.

With this background in mind, the anomaly detection engine 70 includes a classifier 702 and historical request pattern data 704. The input request data 72 to the classifier 702 includes the output of the content classification engine 50 with the content classification type, and other meta-data like data sender, data receiver, date and time. The classifier's isolation forest model is already trained using historical pattern data 704 that map these metadata onto a state space, and this information is used for prediction.

In embodiments, the number of partitions to isolate any given point determines the level at which isolation occurs, and is used to generate an anomaly score. The isolation process is repeated many times by the classifier 702, and the isolation level of each point is noted. Once the iteration is completed, the anomaly score of each point suggests its likelihood of representing an anomaly. The score is a function of the average level at which the point is isolated over the many, random trials. The points or instances having the worst scores gathered on the basis of the score are labeled as anomalies.

Thus, if the classifier 702 identifies the request from the metadata as having a path in an isolation tree that is shorter than a given threshold, the request for EaaS will be flagged as an anomaly or outlier. However, if the classifier 702 identifies the request as having a path in an isolation tree that is longer than the given threshold, the request for EaaS will not be flagged for this purpose. The given threshold may be a fixed length, or an average length over all paths in the tree, or another length for separating anomalous requests from "normal" requests.

The anomaly detection engine 70 also has a policy manager 706 with actionable business rules. When a security anomaly is detected with respect to a given container process, taking a remedial action includes applying those rules to perform one or more of: terminating or preventing execution of the given container process, alerting an individual about the security anomaly (e.g. to suggest a policy change), and storing data associated with the security anomaly in a database for later visualization. Requests that are considered malevolent or malicious should be rejected by the policy manager 706. By contrast, when no security anomaly is detected, the policy manager 706 may provide a signal to the container host system that the latter is authorized to proceed with EaaS provision as requested.

Figure 8:
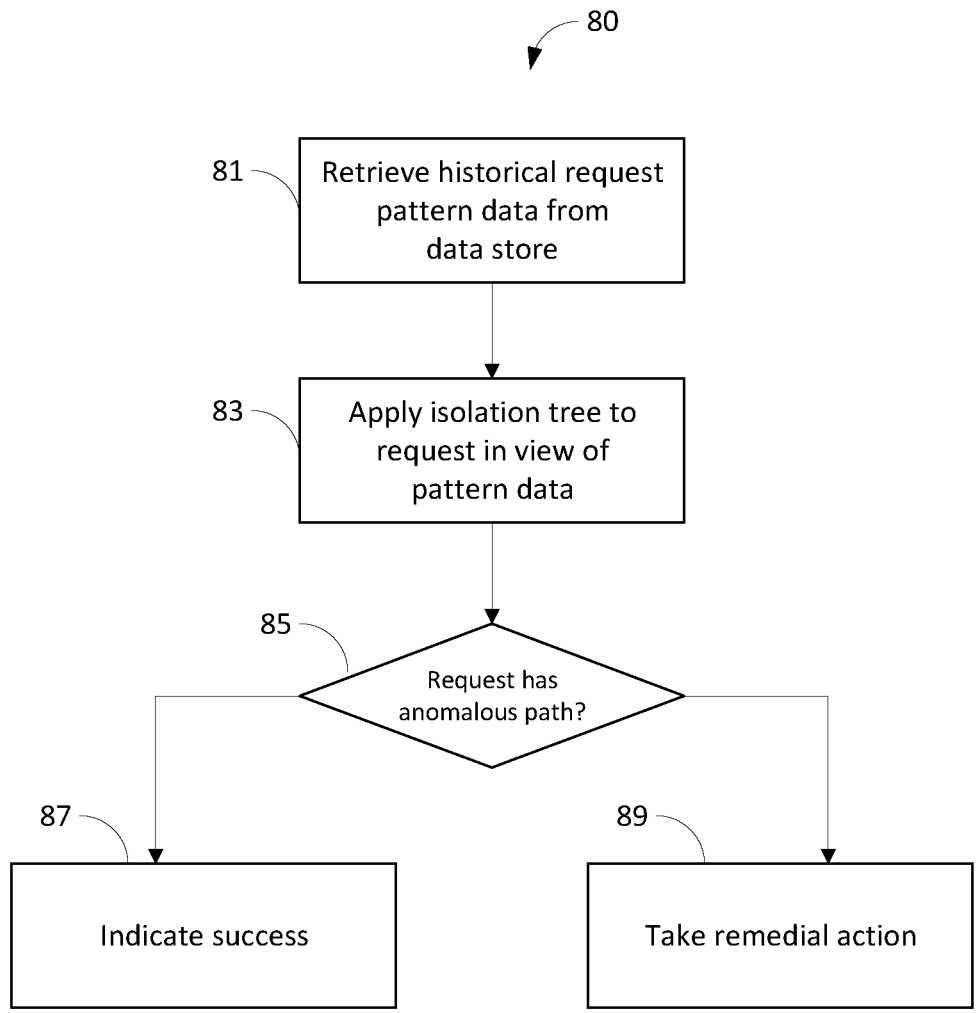
FIG. 8 shows a flowchart of a method of detecting and acting on security anomalies according to an embodiment.

FIG. 8 shows a flowchart of a method 80 of detecting and acting on security anomalies according to an embodiment. The method 80 begins with a process 81 retrieving historical request pattern data from a data store. The historical request pattern data may be data 704, and the data store may be fingerprint store 112. The method 80 continues with a process 83 applying the isolation forest algorithm to input request data in view of the historical request pattern data. The input request data may be data 72, and the isolation forest algorithm may be performed as described in detail above. The method 80 moves to a decision process 85 asking whether the request has an anomalous path score (or length) as determined by the isolation forest algorithm. If not, the method completes with a process 87 indicating success, which may be performed by the policy manager 706. If so, the method completes with a process 89 taking remedial action, which also may be performed by the policy manager 706 as described above.

While an isolation forest algorithm was found to be best for this particular task, other AI/ML classifiers could be used in various embodiments. Illustratively, the isolation forest classifier 702 could be replaced with another unsupervised classifier known in the art having a statistical similarity, such as a different distance algorithm. It is appreciated that, should such a replacement be made, a person having ordinary skill in the art would understand how to modify FIGS. 7 and 8 and their above descriptions to perform content classification into one of a plurality of security categories without undue experimentation.

Figure 9:
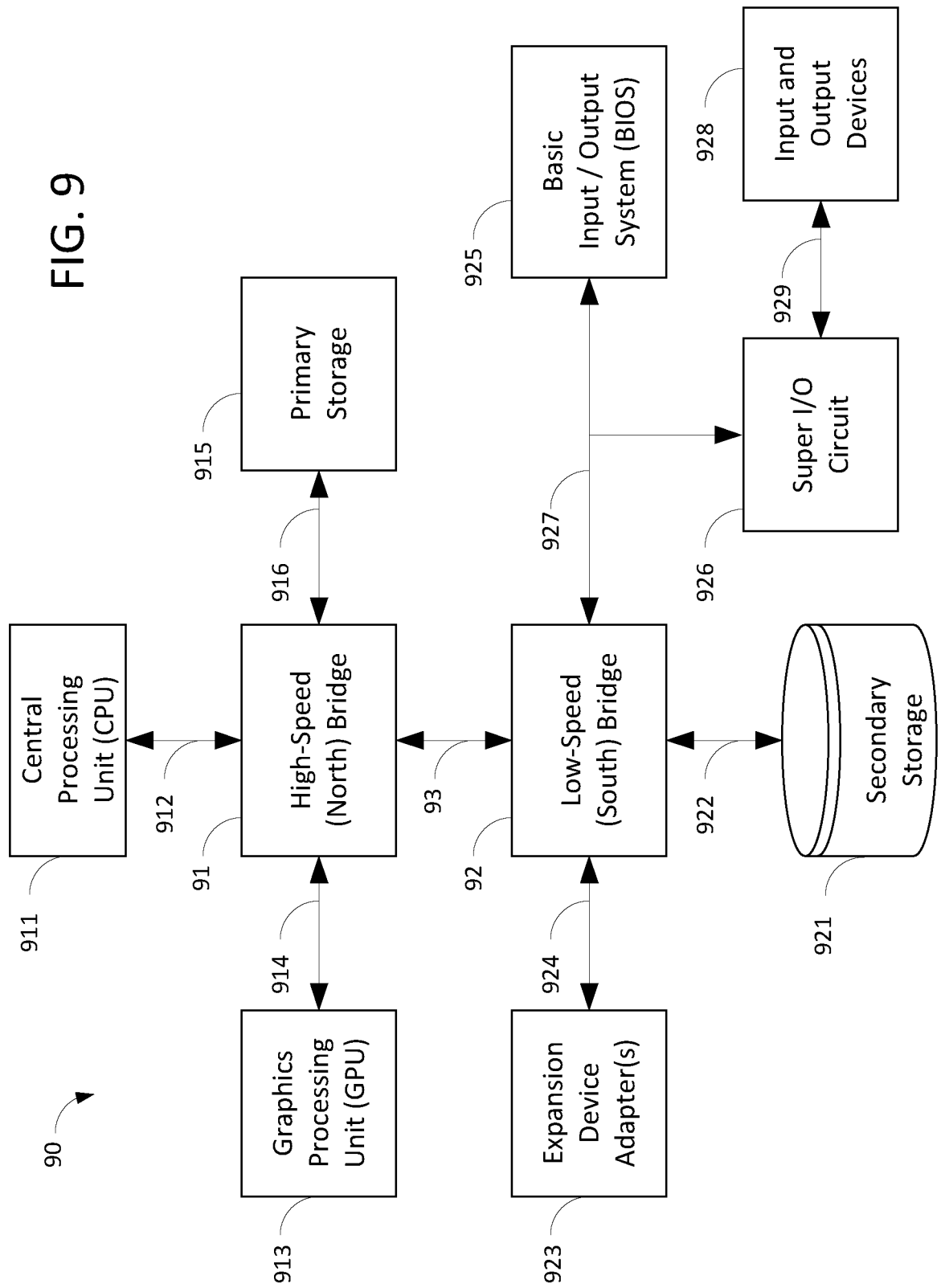
FIG. 9 schematically shows relevant physical components of a computer that may be used to embody the concepts, structures, and techniques disclosed herein.

FIG. 9 schematically shows relevant physical components of a computer 90 that may be used to embody the concepts, structures, and techniques disclosed herein. The computer 90 may be used to implement all or any portion of the system 10, the methods 20, 30, 40, the content classification engine 50, the method 60, the anomaly detection engine 70, or the method 80. Generally, the computer 90 has many functional components that communicate data with each other using data buses. The functional components of FIG. 9 are physically arranged based on the speed at which each must operate, and the technology used to communicate data using buses at the necessary speeds to permit such operation.

Thus, the computer 90 is arranged as high-speed components and buses 911 to 916 and low-speed components and buses 921 to 929. The high-speed components and buses 911 to 916 are coupled for data communication using a high-speed bridge 91, also called a "northbridge," while the low-speed components and buses 921 to 929 are coupled using a low-speed bridge 92, also called a "southbridge."

The computer 90 includes a central processing unit ("CPU") 911 coupled to the high-speed bridge 91 via a bus 912. The CPU 911 is electronic circuitry that carries out the instructions of a computer program. As is known in the art, the CPU 911 may be implemented as a microprocessor; that is, as an integrated circuit ("IC"; also called a "chip" or "microchip"). In some embodiments, the CPU 911 may be implemented as a microcontroller for embedded applications, or according to other embodiments known in the art.

The bus 912 may be implemented using any technology known in the art for interconnection of CPUs (or more particularly, of microprocessors). For example, the bus 912 may be implemented using the HyperTransport architecture developed initially by AMD, the Intel QuickPath Interconnect ("QPI"), or a similar technology. In some embodiments, the functions of the high-speed bridge 91 may be implemented in whole or in part by the CPU 911, obviating the need for the bus 912.

The computer 90 includes one or more graphics processing units (GPUs) 913 coupled to the high-speed bridge 91 via a graphics bus 914. Each GPU 913 is designed to process commands from the CPU 911 into image data for display on a display screen (not shown). In some embodiments, the CPU 911 performs graphics processing directly, obviating the need for a separate GPU 913 and graphics bus 914. In other embodiments, a GPU 913 is physically embodied as an integrated circuit separate from the CPU 911 and may be physically detachable from the computer 90 if embodied on an expansion card, such as a video card. The GPU 913 may store image data (or other data, if the GPU 913 is used as an auxiliary computing processor) in a graphics buffer.

The graphics bus 914 may be implemented using any technology known in the art for data communication between a CPU and a GPU. For example, the graphics bus 914 may be implemented using the Peripheral Component Interconnect Express ("PCI Express" or "PCIe") standard, or a similar technology.

The computer 90 includes a primary storage 915 coupled to the high-speed bridge 91 via a memory bus 916. The primary storage 915, which may be called "main memory" or simply "memory" herein, includes computer program instructions, data, or both, for use by the CPU 911. The primary storage 915 may include random-access memory ("RAM"). RAM is "volatile" if its data are lost when power is removed, and "non-volatile" if its data are retained without applied power. Typically, volatile RAM is used when the computer 90 is "awake" and executing a program, and when the computer 90 is temporarily "asleep", while non-volatile RAM ("NVRAM") is used when the computer 90 is "hibernating"; however, embodiments may vary. Volatile RAM may be, for example, dynamic ("DRAM"), synchronous ("SDRAM"), and double-data rate ("DDR SDRAM"). Non-volatile RAM may be, for example, solid-state flash memory. RAM may be physically provided as one or more dual in-line memory modules ("DIMMs"), or other, similar technology known in the art.

The memory bus 916 may be implemented using any technology known in the art for data communication between a CPU and a primary storage. The memory bus 916 may comprise an address bus for electrically indicating a storage address, and a data bus for transmitting program instructions and data to, and receiving them from, the primary storage 915. For example, if data are stored and retrieved 64 bits (eight bytes) at a time, then the data bus has a width of 64 bits. Continuing this example, if the address bus has a width of 32 bits, then $2^{32}$ memory addresses are accessible, so the computer 90 may use up to $8*2^{32}=32$ gigabytes (GB) of primary storage 915. In this example, the memory bus 916 will have a total width of 64+32=96 bits. The computer 90 also may include a memory controller circuit (not shown) that converts electrical signals received from the memory bus 916 to electrical signals expected by physical pins in the primary storage 915, and vice versa.

Computer memory may be hierarchically organized based on a tradeoff between memory response time and memory size, so depictions and references herein to types of memory as being in certain physical locations are for illustration only. Thus, some embodiments (e.g. embedded systems) provide the CPU 911, the graphics processing units 913, the primary storage 915, and the high-speed bridge 91, or any combination thereof, as a single integrated circuit. In such embodiments, buses 912, 914, 916 may form part of the same integrated circuit and need not be physically separate. Other designs for the computer 90 may embody the functions of the CPU 911, graphics processing units 913, and the primary storage 915 in different configurations, obviating the need for one or more of the buses 912, 914, 916.

The depiction of the high-speed bridge 91 coupled to the CPU 911, GPU 913, and primary storage 915 is merely exemplary, as other components may be coupled for communication with the high-speed bridge 91. For example, a network interface controller ("NIC" or "network adapter") may be coupled to the high-speed bridge 91, for transmitting and receiving data using a data channel. The NIC may store data to be transmitted to, and received from, the data channel in a network data buffer.

The high-speed bridge 91 is coupled for data communication with the low-speed bridge 92 using an internal data bus 93. Control circuitry (not shown) may be required for transmitting and receiving data at different speeds. The internal data bus 93 may be implemented using the Intel Direct Media Interface ("DMI") or a similar technology.

The computer 90 includes a secondary storage 921 coupled to the low-speed bridge 92 via a storage bus 922. The secondary storage 921, which may be called "auxiliary memory", "auxiliary storage", or "external memory" herein, stores program instructions and data for access at relatively low speeds and over relatively long durations. Since such durations may include removal of power from the computer 90, the secondary storage 921 may include non-volatile memory (which may or may not be randomly accessible).

Non-volatile memory may comprise solid-state memory having no moving parts, for example a flash drive or solid-state drive. Alternately, non-volatile memory may comprise a moving disc or tape for storing data and an apparatus for reading (and possibly writing) the data. Data may be stored (and possibly rewritten) optically, for example on a compact disc ("CD"), digital video disc ("DVD"), or Blu-ray disc ("BD"), or magnetically, for example on a disc in a hard disk drive ("HDD") or a floppy disk, or on a digital audio tape ("DAT"). Non-volatile memory may be, for example, read-only ("ROM"), write-once read-many ("WORM"), programmable ("PROM"), erasable ("EPROM"), or electrically erasable ("EEPROM").

The storage bus 922 may be implemented using any technology known in the art for data communication between a CPU and a secondary storage and may include a host adaptor (not shown) for adapting electrical signals from the low-speed bridge 92 to a format expected by physical pins on the secondary storage 921, and vice versa. For example, the storage bus 922 may use a Universal Serial Bus ("USB") standard; a Serial AT Attachment ("SATA") standard; a Parallel AT Attachment ("PATA") standard such as Integrated Drive Electronics ("IDE"), Enhanced IDE ("EIDE"), ATA Packet Interface ("ATAPI"), or Ultra ATA; a Small Computer System Interface ("SCSI") standard; or a similar technology.

The computer 90 also includes one or more expansion device adapters 923 coupled to the low-speed bridge 92 via a respective one or more expansion buses 924. Each expansion device adapter 923 permits the computer 90 to communicate with expansion devices (not shown) that provide additional functionality. Such additional functionality may be provided on a separate, removable expansion card, for example an additional graphics card, network card, host adaptor, or specialized processing card.

Each expansion bus 924 may be implemented using any technology known in the art for data communication between a CPU and an expansion device adapter. For example, the expansion bus 924 may transmit and receive electrical signals using a Peripheral Component Interconnect ("PCI") standard, a data networking standard such as an Ethernet standard, or a similar technology.

The computer 90 includes a basic input/output system ("BIOS") 925 and a Super I/O circuit 926 coupled to the low-speed bridge 92 via a bus 927. The BIOS 925 is a non-volatile memory used to initialize the hardware of the computer 90 during the power-on process. The Super I/O circuit 926 is an integrated circuit that combines input and output ("I/O") interfaces for low-speed input and output devices 928, such as a serial mouse and a keyboard. In some embodiments, BIOS functionality is incorporated in the Super I/O circuit 926 directly, obviating the need for a separate BIOS 925.

The bus 927 may be implemented using any technology known in the art for data communication between a CPU, a BIOS (if present), and a Super I/O circuit. For example, the bus 927 may be implemented using a Low Pin Count ("LPC") bus, an Industry Standard Architecture ("ISA") bus, or similar technology. The Super I/O circuit 926 is coupled to the I/O devices 928 via one or more buses 929. The buses 929 may be serial buses, parallel buses, other buses known in the art, or a combination of these, depending on the type of I/O devices 928 coupled to the computer 90.

The techniques and structures described herein may be implemented in any of a variety of different forms. For example, features of embodiments may take various forms of communication devices, both wired and wireless; television sets; set top boxes; audio/video devices; laptop, palmtop, desktop, and tablet computers with or without wireless capability; personal digital assistants (PDAs); telephones; pagers; satellite communicators; cameras having communication capability; network interface cards (NICs) and other network interface structures; base stations; access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of embodiments are grouped together in one or more individual embodiments for the purpose of streamlining the disclosure. This method of disclosure is not to be interpreted as reflecting an intention that the claims require more features than are expressly recited therein. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A system for mediating transfer of encrypted data files to and from a plurality of external computer systems, the system comprising:
    a file store for storing the encrypted data files;
    a data store for storing cryptographic data associated with each of the external computer systems; and
    a container host system, communicatively coupled to the file store and the data store, for creating and hosting concurrent, data-isolated container processes for performing cryptographic operations;
    wherein the container host system is configured to access a fingerprint service having (a) a content classification engine for classifying container processes into one of a plurality of security categories, and (b) an anomaly detection engine for detecting security anomalies on the basis of the classifying; and
    wherein each container process is configured, when the fingerprint service does not detect it as having a security anomaly, to either (a) decrypt an encrypted data file in the file store received from an external computer system according to its associated stored cryptographic data, or (b) encrypt data, as an encrypted data file in the file store for subsequent transmission to an external computer system, according to its associated stored cryptographic data.

2. The system according to claim 1, wherein the content classification engine is configured for classifying container processes using supervised machine learning.

3. The system according to claim 2, wherein using the supervised machine learning comprises using a support vector machine trained on a corpus having data according to each of the plurality of security categories.

4. The system according to claim 1, wherein the anomaly detection engine is configured for detecting security anomalies using unsupervised machine learning.

5. The system according to claim 4, wherein using unsupervised machine learning comprises (a) creating a state space of historical container processes, and (b) detecting a security anomaly with respect to a given container process when the given container process has a path in an isolation tree that is shorter than a given threshold.

6. The system according to claim 5, wherein the state space encodes one or more of: an identity of a data sender, an identity of a data receiver, a file type, a date, and a time of day.

7. The system according to claim 1, wherein the anomaly detection engine further comprises a policy manager for, when a security anomaly is detected with respect to a given container process, taking a remedial action including one or more of: terminating or preventing execution of the given container process, alerting an individual about the security anomaly, and storing data associated with the security anomaly in a database for later visualization.

8. The system according to claim 1, further comprising a key manager for ensuring that the cryptographic data stored in the data store are valid, wherein each container process hosted in the container host system is configured to access the key manager prior to using the cryptographic data.

9. The system according to claim 8, wherein the key manager is configured for detecting that a cryptographic key, used to encrypt data files, has been corrupted or is nearing an expiration date, and for responsively generating a new cryptographic key and exchanging the new cryptographic key with the plurality of external computer systems.

10. The system according to claim 1, wherein the data store comprises a plurality of vaults for storing cryptographic data, and wherein the container host system is configured for creating container processes according to data describing a target vault within the plurality of vaults.

11. A method of mediating transfer of encrypted data files to and from a plurality of external computer systems, the method comprising:
storing cryptographic data associated with each of the external computer systems in a data store;
creating and hosting concurrent, data-isolated container processes for performing cryptographic operations in a container host system;
accessing, by one of the hosted container processes, a fingerprint service for (a) classifying container processes into one of a plurality of security categories, and (b) detecting security anomalies on the basis of the classifying; and
when the fingerprint service does not detect that the one of the hosted container processes has a security anomaly, either (a) decrypting an encrypted data file received from an external computer system according to its associated stored cryptographic data, or (b) encrypting data, as an encrypted data file for subsequent transmission to an external computer system, according to its associated stored cryptographic data.

12. The method according to claim 11, wherein classifying container processes comprises using supervised machine learning.

13. The method according to claim 12, wherein using the supervised machine learning comprises using a support vector machine trained on a corpus having data according to each of the plurality of security categories.

14. The method according to claim 11, wherein detecting security anomalies comprises using unsupervised machine learning.

15. The method according to claim 14, wherein using unsupervised machine learning comprises (a) creating a state space of historical container processes, and (b) detecting a security anomaly with respect to a given container process when the given container process has a path in an isolation tree that is shorter than a given threshold.

16. The method according to claim 15, wherein the state space encodes one or more of: an identity of a data sender, an identity of a data receiver, a file type, a date, and a time of day.

17. The method according to claim 11, further comprising, when a security anomaly is detected with respect to a given container process, taking a remedial action including one or more of: terminating or preventing execution of the given container process, alerting an individual about the security anomaly, and storing data associated with the security anomaly in a database for later visualization.

18. The method according to claim 11, wherein each container process hosted in the container host system is configured to access a key manager prior to using the cryptographic data.

19. The method according to claim 18, wherein the key manager is configured for detecting that a cryptographic key, used to encrypt data files, has been corrupted or is nearing an expiration date, and for responsively generating a new cryptographic key and exchanging the new cryptographic key with the plurality of external computer systems.

20. The method according to claim 11, wherein the data store comprises a plurality of vaults for storing cryptographic data, and wherein the container host system is configured for creating container processes according to data describing a target vault within the plurality of vaults.

* * * * *